(12) United States Patent
Yonezu et al.

(10) Patent No.: US 8,287,329 B2
(45) Date of Patent: Oct. 16, 2012

(54) GRINDING MACHINE AND GRINDING METHOD

(75) Inventors: Toshihiro Yonezu, Nishio (JP); Hiroaki Sugiura, Toyota (JP); Satoshi Ito, Ichinomiya (JP); Yoshitaro Osaki, Nukata-gun (JP)

(73) Assignee: JTekt Corporation, Osaki-shi (JP)

( * ) Notice: Subject to any disclaimer, the term of this patent is extended or adjusted under 35 U.S.C. 154(b) by 464 days.

(21) Appl. No.: 12/578,671

(22) Filed: Oct. 14, 2009

(65) Prior Publication Data
US 2010/0105289 A1  Apr. 29, 2010

(30) Foreign Application Priority Data
Oct. 28, 2008 (JP) ................................. 2008-276538

(51) Int. Cl.
*B24B 49/00* (2012.01)
*B24B 51/00* (2006.01)

(52) U.S. Cl. .................................. 451/5; 451/8; 451/49

(58) Field of Classification Search .................. 340/680; 451/5, 8, 9, 10, 11, 49, 57, 58, 65, 66, 242, 451/246
See application file for complete search history.

(56) References Cited

U.S. PATENT DOCUMENTS

| | | | | |
|---|---|---|---|---|
| 4,884,373 A * | 12/1989 | Suzuki et al. | ...................... | 451/5 |
| 5,289,660 A * | 3/1994 | Terasaki et al. | .................. | 451/49 |
| 5,315,789 A * | 5/1994 | Takashi | .............................. | 451/5 |
| 5,562,523 A | 10/1996 | Asano et al. | | |
| 5,846,121 A * | 12/1998 | Hayashi et al. | .................... | 451/8 |
| 6,128,547 A | 10/2000 | Tomoeda et al. | | |
| 6,623,332 B1 | 9/2003 | Junker | | |
| 6,813,536 B1 * | 11/2004 | Gottschald | .................... | 700/160 |
| 7,985,120 B2 * | 7/2011 | Osaki et al. | ........................ | 451/5 |

FOREIGN PATENT DOCUMENTS

| | | |
|---|---|---|
| DE | 198 57 364 A1 | 6/2000 |
| JP | 62-282865 | 12/1987 |
| JP | 2005-246494 | 9/2005 |

OTHER PUBLICATIONS

Office Action issued Jun. 1, 2012 in European Patent Application No. 09 174 198.3-2302.

* cited by examiner

*Primary Examiner* — Timothy V Eley
(74) *Attorney, Agent, or Firm* — Oblon, Spivak, McClelland, Maier & Neustadt, L.L.P.

(57) ABSTRACT

A grinding machine includes: a workhead (22) that rotatably supports a solid cylindrical or hollow cylindrical workpiece (W); a grinding wheel (43) that moves relative to the workhead (22) in a direction that intersects with a rotation axis of the workhead (22) to grind an outer peripheral surface of the workpiece (W); a measuring apparatus (50) that measures a position of an outer peripheral surface of the workpiece (W) corresponding to a rotation angle of the workhead (22); an outer peripheral surface shape calculation unit (64) that calculates an outer peripheral surface shape of the workpiece (W) on the basis of the position of the outer peripheral surface of the workpiece (W) measured by the measuring apparatus (50) during grinding; and a grinding condition determination unit (65) that determines a condition of grinding, which is performed after measurement by the measuring apparatus (50), on the basis of the calculated outer peripheral surface shape of the workpiece (W).

8 Claims, 4 Drawing Sheets

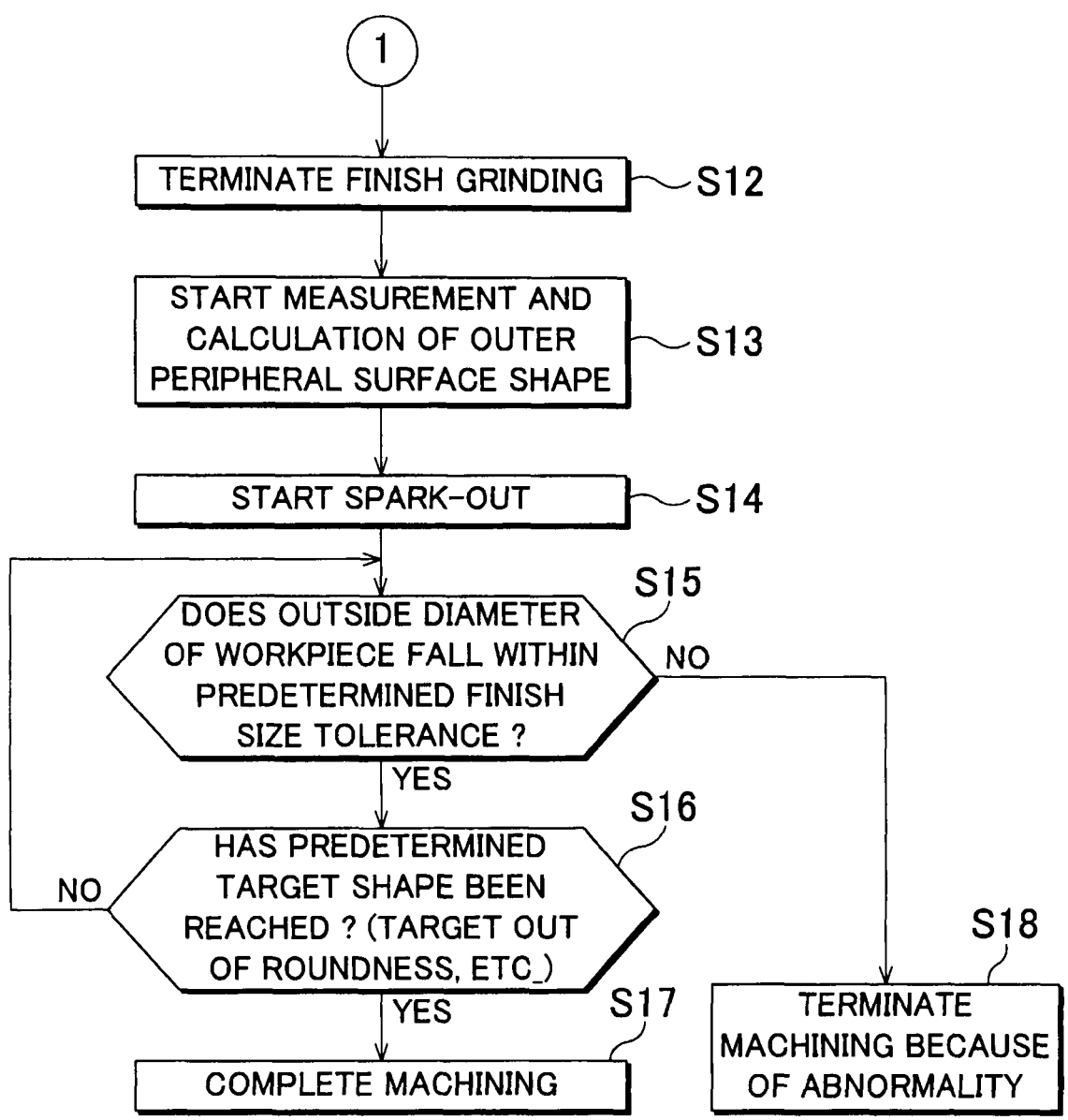

GRINDING MACHINE AND GRINDING METHOD

INCORPORATION BY REFERENCE

The disclosure of Japanese Patent Applications No. 2008-276538 filed on Oct. 28, 2008 including the specification, drawings and abstract, is incorporated herein by reference in its entirety.

BACKGROUND OF THE INVENTION

1. Field of the Invention

The invention relates to a grinding machine and grinding method that grind an outer peripheral surface of a solid cylindrical or hollow cylindrical workpiece.

2. Description of the Related Art

In an prior art, in order to accurately grind an outer peripheral surface of a solid cylindrical or hollow cylindrical workpiece, for example, Japanese Patent Application Publication No. 62-282865 (JP-A-62-282865) uses a grinding machine equipped with a sizing device. The sizing device described in JP-A-62-282865, or the like, is used to determine a change timing at which the process is changed from rough grinding into finish grinding and a change timing at which the process is changed from finish grinding into spark-out. Specifically, the sizing device outputs a signal at the time when the outside diameter of a workpiece measured by the sizing device reaches predetermined outside diameters at the respective change timings, and the process is changed into the next grinding on the basis of the signal output from the sizing device.

However, the sizing device outputs a signal when the minimum diameter of a workpiece reaches a predetermined outside diameter. Therefore, if the radially cross-sectional shape of a workpiece is formed not in a perfect round shape but in an elliptical shape, there is a case where the minor axis of the workpiece has reached a predetermined outside diameter but the major axis has not yet reached the predetermined diameter. Various factors, such as fluctuations in grinding resistance may cause a workpiece to be machined into such an elliptical shape. Thus, after grinding, it is necessary to check the outer peripheral shape of a workpiece by an out-of-roundness measuring device. For example, an outer peripheral surface shape of a workpiece with respect to the rotation center of the workpiece, that is, whether a workpiece is decentered, the out of roundness of a workpiece, the surface texture of a workpiece, and the like, are checked as the outer peripheral surface shape of a workpiece.

In this way, when a workpiece is determined as a defective piece through checking after grinding, the workpiece cannot be shipped as a product. Furthermore, because of the checking process, a cycle time from the start of machining a workpiece to the completion of the workpiece extends. Then, cost increases because of the checking process.

SUMMARY OF THE INVENTION

The invention provides a grinding machine and grinding method that are able to accurately machine a workpiece while eliminating a checking process after grinding.

A first aspect of the invention provides a grinding machine. The grinding machine includes: a workhead that rotatably supports a solid cylindrical or hollow cylindrical workpiece; a grinding wheel that moves relative to the workhead in a direction that intersects with a rotation axis of the workhead to grind an outer peripheral surface of the workpiece; a measuring apparatus that measures a position of the outer peripheral surface of the workpiece corresponding to a rotation angle of the workhead; an outer peripheral surface shape calculation unit that calculates an outer peripheral surface shape of the workpiece on the basis of the position of the outer peripheral surface of the workpiece measured by the measuring apparatus during grinding; and a grinding condition determination unit that determines a condition of grinding, which is performed after measurement by the measuring apparatus, on the basis of the calculated outer peripheral surface shape.

With the configuration according to the above aspect, measurement, which is performed after grinding in the prior art, is performed during grinding. Then, in the prior art, measurement performed after grinding is just a product check after machining. In contrast, measurement during grinding according to the first aspect of the invention determines a condition of subsequent grinding. That is, depending on measurement results, it is possible to change a condition of grinding after measurement. In this way, it is possible to accurately machine a workpiece while eliminating check of a product after grinding.

In the grinding machine according to the above aspect, the outer peripheral surface shape calculation unit may calculate an outer peripheral surface shape of the workpiece during spark-out, and the grinding condition determination unit may terminate the spark-out when the calculated outer peripheral surface shape has reached a predetermined target shape.

With the configuration according to the above aspect, spark-out may be terminated in a short period of time as compared with the prior art. In the prior art, in spark-out, a certain period of time or the number of rotations of the workpiece, or the like, has been set, for example, on the basis of the skilled experience of a worker. In contrast, according to the aspect of the invention, on the basis of the measurement results, spark-out is terminated when the calculated outer peripheral surface shape of the workpiece has reached the predetermined target shape. That is, spark-out may be terminated in a short period of time as compared with the prior art and in a state where the accuracy of the shape is reliably satisfied.

In the grinding machine according to the above aspect, the outer peripheral surface shape calculation unit may calculate an outer peripheral surface shape of the workpiece during rough grinding or between rough grinding and finish grinding, and the grinding condition determination unit may terminate grinding when the calculated outer peripheral surface shape does not satisfy a predetermined shape condition.

With the configuration according to the above aspect, measurement by the measuring apparatus is performed during rough grinding or at the time of switching between rough grinding and finish grinding during machining. Then, when it is determined that the obtained outer peripheral surface shape of the workpiece has reached an unrecoverable degree by subsequent machining on the basis of the results measured during rough grinding or between rough grinding and finish grinding, machining is terminated at that time. In the prior art, it is difficult to determine whether the workpiece is a defective piece unless machining up to a final process is completed. In contrast, according to the aspect of the invention, it is possible to determine at an early stage whether it is a defective piece.

In the grinding machine according to the above aspect, the outer peripheral surface shape calculation unit may calculate an outer peripheral surface shape of the workpiece during rough grinding or between rough grinding and finish grinding, and the grinding condition determination unit may change a machining condition in the finish grinding on the basis of the calculated outer peripheral surface shape.

With the configuration according to the above aspect, measurement by the measuring apparatus is performed at the timing at which the machining accuracy of the workpiece for which machining has been ultimately completed is increased by changing the machining condition thereafter. That is, on the basis of the results measured during rough grinding or between rough grinding and finish grinding, when it is determined that the workpiece W may become a defective piece if machining is continued under the predetermined machining condition, the machining condition thereafter may be changed. Generally, the sharpness of a grinding wheel becomes poor because of abrasion, or the like, of the grinding wheel. When the sharpness of the grinding wheel is good, a workpiece may be accurately machined even when machining is performed at high speed. On the other hand, as the sharpness of the grinding wheel gets poor, the grinding speed (grinding amount per unit time) is reduced to make it possible to obtain accurate machining. In addition, other than abrasion of the grinding wheel, there are many factors that influence the machining accuracy of a workpiece. In this way, with the aspect of the invention, even when various factors influence machining accuracy, it is possible to machine a workpiece at high speed as much as possible without producing a defective piece. That is, it is possible to achieve both accurate machining and a short machining time.

In the grinding machine according to the above aspect, the grinding condition determination unit may change a grinding amount per unit time in the finish grinding on the basis of the calculated outer peripheral surface shape. With the configuration according to the above aspect, the grinding amount per unit time is reduced to make it possible to reliably and accurately machine a workpiece.

In the grinding machine according to the above aspect of the invention, the outer peripheral surface shape of the workpiece may include at least any one of an outer peripheral surface shape of the workpiece with respect to a rotation center of the workpiece, an out of roundness of the workpiece and a surface texture of the workpiece.

With the configuration according to the above aspect, the outer peripheral surface shape of the workpiece is defined as the outer peripheral surface shape of the workpiece. The outer peripheral surface shape of the workpiece may be any one of the outer peripheral surface shape of the workpiece with respect to the rotation center of the workpiece, the out of roundness of the workpiece and the surface texture of the workpiece or may be all of them. Alternatively, the outer peripheral surface shape of the workpiece may be any two of them selected. These may be appropriately changed in accordance with the required machining accuracy.

A second aspect of the invention provides a grinding method that grinds an outer peripheral surface of a rotatably supported solid cylindrical or hollow cylindrical workpiece by moving a wheelhead relative to the workpiece in a direction that intersects with a rotation axis of the workpiece. The grinding method includes: measuring a position of an outer peripheral surface of the workpiece corresponding to a rotation angle of the workpiece by a measuring apparatus during grinding; calculating an outer peripheral surface shape of the workpiece on the basis of the position of the outer peripheral surface measured by the measuring apparatus; and determining a condition of grinding, which is performed after measurement by the measuring apparatus, on the basis of the calculated outer peripheral surface shape.

Here, the sizing device measures the minimum diameter of the workpiece, whereas the measuring apparatus according to the aspect of the invention measures the position of the outer peripheral surface of the workpiece corresponding to the rotation angle of the workhead. That is, the measuring apparatus measures the position coordinate of the outer peripheral surface of the workpiece corresponding to each rotation phase of the workpiece. Thus, the outer peripheral surface shape calculation unit is able to obtain not only the minimum diameter of the workpiece measured by the sizing device but also the outer peripheral surface shape itself of the workpiece.

With the above aspect of the invention, the same advantageous effects as those of the grinding machine according to the first aspect may be obtained. That is, according to the above aspect, depending on measurement results, it is possible to change a condition of grinding after measurement. In this way, it is possible to accurately machine a workpiece while eliminating check of a product after grinding.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIGS. 3A and 3B is a flowchart that illustrates a grinding method that uses the grinding machine.

DETAILED DESCRIPTION OF EMBODIMENTS

Figure 1:
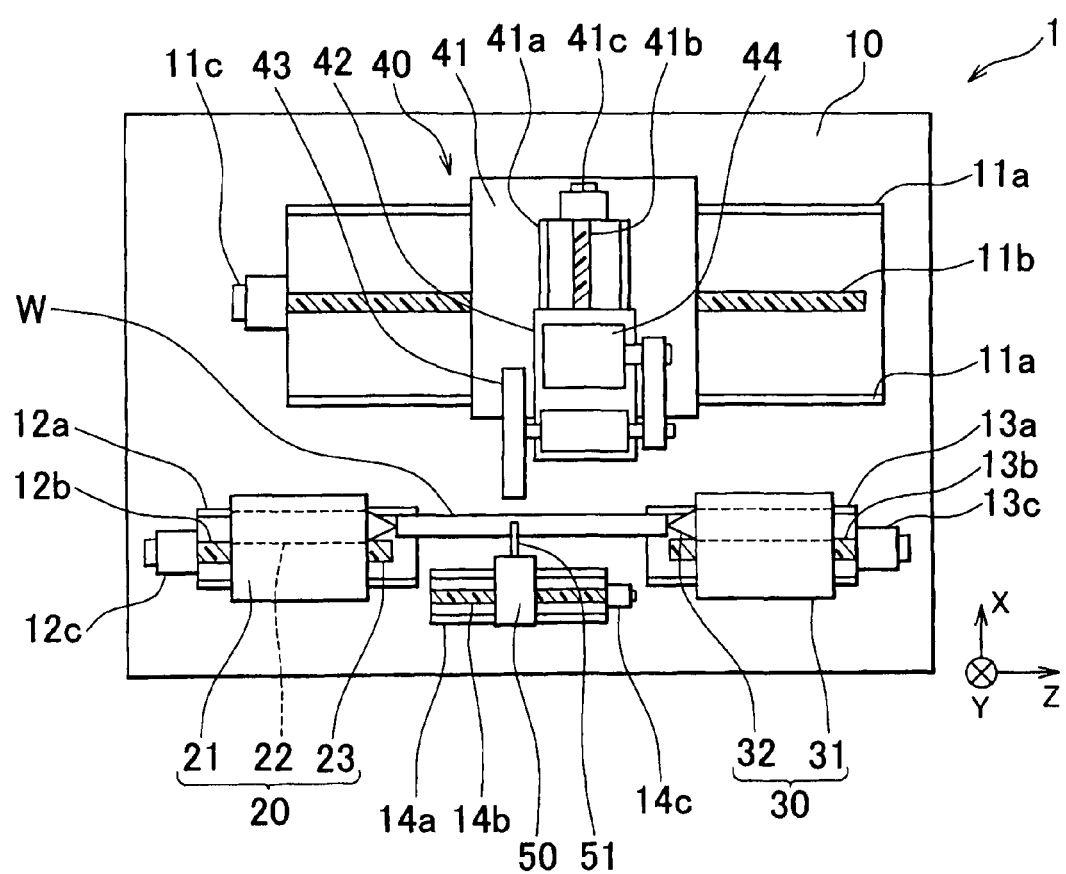
FIG. 1 is a plan view of a grinding machine.

Hereinafter, a specific embodiment of a grinding machine according to the invention will be described with reference to the accompanying drawings. The overall configuration of the grinding machine 1 according to the present embodiment will be described with reference to FIG. 1. FIG. 1 is a plan view of the grinding machine 1. As shown in FIG. 1, the grinding machine 1 includes a bed 10, a headstock 20, a tailstock 30, a grinding wheel support device 40, and a measuring apparatus 50.

The bed 10 has a substantially rectangular shape, and is located on a floor. A pair of wheelhead guide rails 11a are formed parallel to each other on the upper face of the bed 10 so as to extend in a horizontal direction (Z-axis direction) in FIG. 1. The pair of wheelhead guide rails 11a are rails on which a wheelhead traverse base 41 is slidable. The wheelhead traverse base 41 constitutes the grinding wheel support device 40. Furthermore, on the lower side of the pair of wheelhead guide rails 11a in FIG. 1 (near side of the machine) within the upper face of the bed 10, a pair of first guide rails 12a are formed parallel to each other so as to extend in the horizontal direction (Z-axis direction) in FIG. 1. The headstock 20 is slidable on the pair of first guide rails 12a. In addition, on the right side of the pair of first guide rails 12a in FIG. 1 within the upper face of the bed 10, a pair of second guide rails 13a are formed parallel to each other so as to extend in the horizontal direction (Z-axis direction) of FIG. 1. The tailstock 30 is slidable on the pair of second guide rails 13a. Furthermore, a pair of third guide rails 14a are provided between the first guide rails 12a and the second guide rails 13a and are formed parallel to each other so as to extend in the horizontal direction (Z-axis direction) of FIG. 1.

In addition, a wheelhead Z-axis ball screw 11b is located on the bed 10 between the pair of wheelhead guide rails 11a in order to drive the wheelhead traverse base 41 in the horizontal direction in FIG. 1. A wheelhead Z-axis motor 11c is located on the bed 10 and drives the wheelhead Z-axis ball screw 11b for rotation. Furthermore, a W1-axis ball screw 12b is located on the bed 10 between the pair of first guide rails 12a in order to drive the headstock 20 in the horizontal direction in FIG. 1. A W1-axis motor 12c is located on the bed 10 and drives the W1-axis ball screw 12b for rotation. A W2-axis ball screw 13b is located on the bed 10 between the pair of second guide rails 13a in order to drive the tailstock 30 in the horizontal direction in FIG. 1. A W2-axis motor 13c is located on the bed 10 and drives the W2-axis ball screw 13b for rotation. Furthermore, a W3-axis ball screw 14b is located on the bed 10 between the pair of third guide rails 14a in order to drive the measuring apparatus 50 in the horizontal direction in FIG. 1. A W3-axis motor 14c is arranged and drives the W3-axis ball screw 14b for rotation.

The headstock 20 includes a headstock body 21, a workhead 22 and a workhead center 23. The headstock body 21 is slidably located on the pair of first guide rails 12a within the upper face of the bed 10. Then, the headstock body 21 is coupled to a nut member of the W1-axis ball screw 12b. The headstock body 21 is driven by the W1-axis motor 12c to move along the pair of first guide rails 12a. The workhead 22 is inserted and supported inside the headstock body 21 so that the workhead 22 is rotatable about an axis (around the Z-axis of FIG. 1). The workhead 22 is driven by a motor (not shown) for rotation. In addition, the workhead center 23 is connected to the right end of the workhead 22. The workhead center 23 supports one end of an elongated workpiece W in the axial direction.

The tailstock 30 includes a tailstock body 31 and a tailstock center 32. The tailstock body 31 is slidably located on the pair of second guide rails 13a within the upper face of the bed 10. Then, the tailstock body 31 is coupled to a nut member of the W2-axis ball screw 13b. The tailstock body 31 is driven by the W2-axis motor 13c to move along the pair of second guide rails 13a. A through-hole extends through the tailstock body 31 in the horizontal direction in FIG. 1. The tailstock center 32 is rotatably inserted and supported in the through-hole of the tailstock body 31. The rotation axis of the tailstock center 32 is located coaxially with the rotation axis of the workhead 22. Then, the tailstock center 32 supports the other end of the workpiece W in the axial direction. That is, the tailstock center 32 is arranged to face the workhead center 23. Then, the workhead center 23 and the tailstock center 32 support both ends of the workpiece W. In this way, the workpiece W is held rotatably around the axis of the workhead (around the Z axis) by the workhead center 23 and the tailstock center 32.

The grinding wheel support device 40 includes the wheelhead traverse base 41, a wheelhead 42, a grinding wheel 43 and a grinding wheel rotating motor 44. The wheelhead traverse base 41 is formed in a rectangular plate-like shape. The wheelhead traverse base 41 is slidably located on the pair of wheelhead guide rails 11a within the upper face of the bed 10. The wheelhead traverse base 41 is coupled to a nut member of the wheelhead Z-axis ball screw 11b. The wheelhead traverse base 41 is driven by the wheelhead Z-axis motor 11c to move along the pair of wheelhead guide rails 11a. A pair of X-axis guide rails 41a are located on the upper face of the wheelhead traverse base 41. The pair of X-axis guide rails 41a are formed parallel to each other so as to extend in the vertical direction (X-axis direction) in FIG. 1. The wheelhead 42 is slidable on the pair of X-axis guide rails 41a. In addition, an X-axis ball screw 41b is located on the wheelhead traverse base 41 between the pair of X-axis guide rails 41a in order to drive the wheelhead 42 in the vertical direction in FIG. 1. An X-axis motor 41c is located on the wheelhead traverse base 41 and drives the X-axis ball screw 41b for rotation.

The wheelhead 42 is slidably located on the pair of X-axis guide rails 41a within the upper face of the wheelhead traverse base 41. Then, the wheelhead 42 is coupled to a nut member of the X-axis ball screw 41b. The wheelhead 42 is driven by the X-axis motor 41c to move along the pair of X-axis guide rails 41a. That is, the wheelhead 42 is movable in the X-axis direction and in the Z-axis direction (traverse feed direction) with respect to the bed 10, the headstock 20 and the tailstock 30.

Then, a through-hole extends through a lower portion of the wheelhead 42 in FIG. 1 in the horizontal direction in FIG. 1. A grinding wheel rotary shaft member (not shown) is supported in the through-hole of the wheelhead 42 so as to be rotatable around the axis of the grinding wheel (around the Z axis). The grinding wheel 43 is coaxially connected to one end (left end in FIG. 1) of the grinding wheel rotary shaft member. In addition, the grinding wheel rotating motor 44 is fixed to the upper face of the wheelhead 42. Then, a belt is looped between a pulley at the other end (right end in FIG. 1) of the grinding wheel rotary shaft member and a pulley at the rotary shaft of the grinding wheel rotating motor 44. Thus, the grinding wheel rotating motor 44 drives to rotate the grinding wheel 43 around the axis of the grinding wheel.

The measuring apparatus 50 is slidably located on the pair of third guide rails 14a within the upper face of the bed 10. Then, the measuring apparatus 50 is coupled to a nut member of the W3-axis ball screw 14b. The measuring apparatus 50 is driven by the W3-axis motor 14c to move along the pair of third guide rails 14a. In addition, the measuring apparatus 50 includes a pair of gauge heads 51 that are arranged to face each other. The pair of gauge heads 51 are allowed to move toward or away from the workpiece W. Specifically, the gauge heads 51 are allowed to move in the X direction. The pair of gauge heads 51 are configured to contact the workpiece W in a vertical plane that passes through the rotation axis of the workhead 22. Then, each of the gauge heads 51 is able to measure the Y-axis coordinate of a portion of the workpiece W, located in the vertical plane that passes through the rotation axis of the workhead 22. That is, the pair of gauge heads 51 have the function of a so-called sizing device that measures the outside diameter of the workpiece W. In addition, the pair of gauge heads 51 are able to measure the position of the outer peripheral surface of the workpiece W corresponding to a rotation angle of the workhead 22. Note that, in order to measure the position of the outer peripheral surface of the workpiece W corresponding to the rotation angle of the workhead 22, it is sufficient to use a signal of any one of the pair of gauge heads 51.

Figure 2:
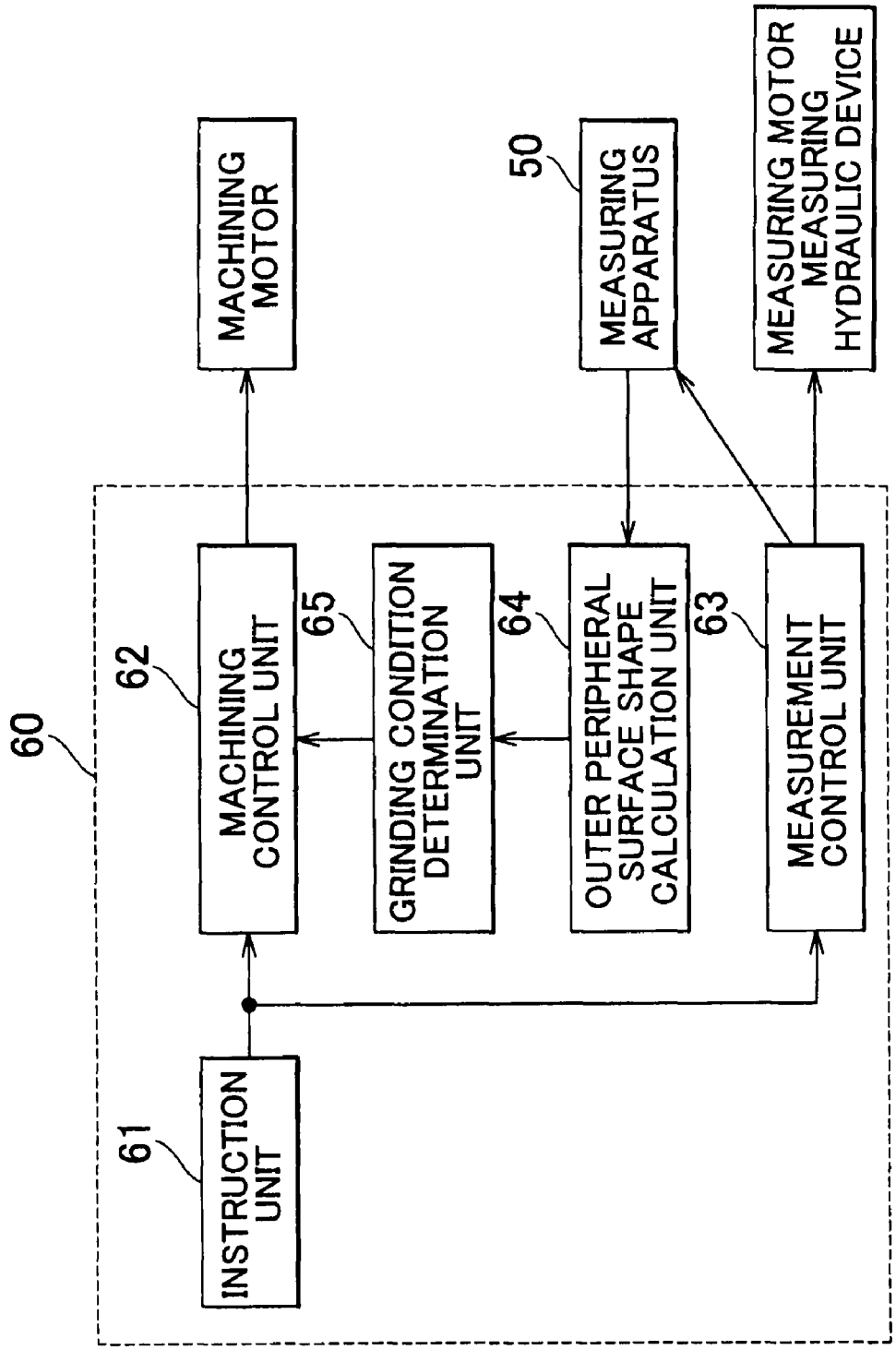
FIG. 2 is a block diagram of a controller.

Next, the detailed configuration of a controller 60 will be described with reference to FIG. 2. FIG. 2 is a block diagram of the controller 60. As shown in FIG. 2, the controller 60 includes an instruction unit 61, a machining control unit 62, a measurement control unit 63, an outer peripheral surface shape calculation unit 64, and a grinding condition determination unit 65.

The instruction unit 61 outputs an instruction related to machining and measurement of the hollow cylindrical or solid cylindrical workpiece W on the basis of a predetermined program. The machining control unit 62 controls various motors necessary for machining on the basis of the instruction output from the instruction unit 61 and an instruction output from the grinding condition determination unit 65.

The measurement control unit 63 controls the measuring apparatus 50 on the basis of the instruction output from the instruction unit 61 in order for the measuring apparatus 50 to measure the workpiece W during grinding. Specifically, the measurement control unit 63 controls the W3-axis motor 14c (which corresponds to a "measuring motor" in FIG. 2) to position the measuring apparatus 50 in the Z-axis direction, and uses a measuring hydraulic cylinder (which corresponds to a "measuring hydraulic device" in FIG. 2) to control movement of the measuring apparatus 50 in the X-axis direction. In addition, the measurement control unit 63 uses the measuring apparatus 50 to measure the workpiece W.

The outer peripheral surface shape calculation unit 64 calculates the outer peripheral surface shape of the workpiece W on the basis of the position of the outer peripheral surface of the workpiece W measured by the measuring apparatus 50 during grinding. As described above, the measuring apparatus 50 measures the position of the outer peripheral surface of the workpiece W corresponding to the rotation angle of the workhead 22. Then, the outer peripheral surface shape calculation unit 64 calculates the outer peripheral surface shape of the workpiece W on the basis of the measurement results output from the measuring apparatus 50 and the rotation angle of the workhead 22 at the time of the measurement. Here, the outer peripheral surface shape of the workpiece W includes at least one of the outer peripheral surface shape of the workpiece W with respect to the rotation center of the workpiece W, the out of roundness of the workpiece W and the surface texture of the workpiece W. In the present embodiment, the outer peripheral surface shape of the workpiece W includes all the above three types. Note that the outer peripheral surface shape of the workpiece W with respect to the rotation center of the workpiece W, for example, corresponds to an eccentricity when the workpiece W is eccentric. In addition, the outer peripheral surface shape calculation unit 64 causes the measuring apparatus 50 to function as the sizing device to calculate the outside diameter of the workpiece W. That is, the outer peripheral surface shape calculation unit 64 also calculates the outside diameter of the workpiece W in addition to the eccentricity, the out of roundness and the surface texture. Note that the outside diameter measured here is a minimum value among distances between the pair of gauge heads 51.

The grinding condition determination unit 65 determines the condition of grinding on the basis of the outer peripheral surface shape of the workpiece W and the outside diameter of the workpiece W, which are calculated by the outer peripheral surface shape calculation unit 64. The grinding is performed after measurement by the measuring apparatus 50. The detail of the condition of grinding will be described later.

Figure 3A:
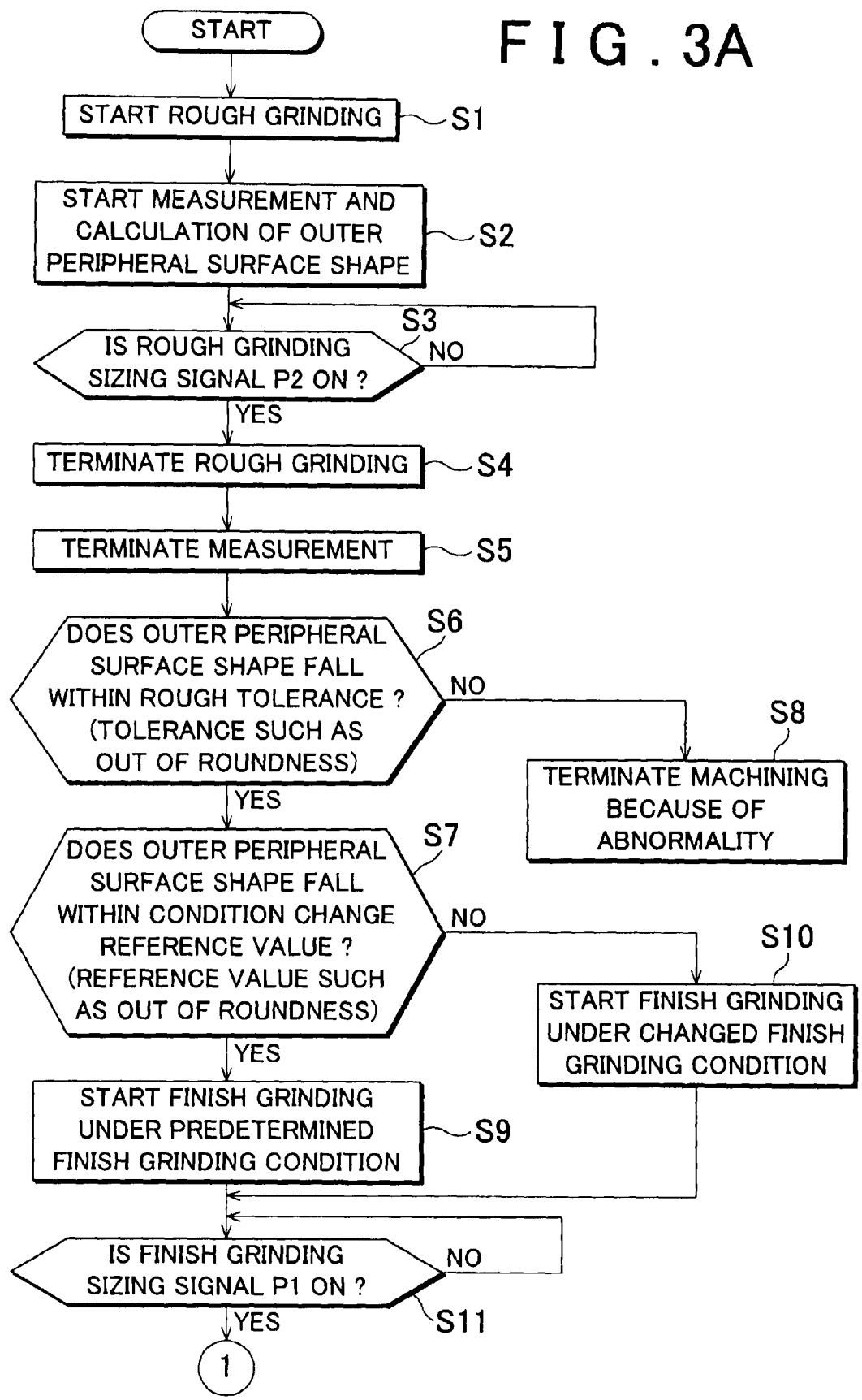

Next, a grinding method using the above described grinding machine 1 will be described with reference to FIG. 3. FIG. 3 is a flowchart that illustrates the grinding method using the grinding machine 1.

In the present embodiment, the workpiece W undergoes rough grinding, finish grinding and spark-out. As shown in FIG. 3, first, rough grinding is performed (S1). In the rough grinding, a cutting speed at which the workpiece W is ground by the grinding wheel 43 is increased to increase a grinding amount per unit time. Here, the outside diameter of the workpiece W is measured by the measuring apparatus 50 serving as the sizing device from the start of rough grinding to the end of all types of grinding. That is, the outer peripheral surface shape calculation unit 64 calculates the outside diameter of the workpiece W during grinding. Subsequently, the position of the outer peripheral surface of the workpiece W is started to be measured by the measuring apparatus 50, and the outer peripheral surface shape of the workpiece W is calculated by the outer peripheral surface shape calculation unit 64 on the basis of the measured position of the outer peripheral surface of the workpiece W (S2).

After that, rough grinding is continued until a rough grinding sizing signal P2 turns on (S3). Here, the rough grinding sizing signal P2 turns on when the outside diameter of the workpiece W calculated by the outer peripheral surface shape calculation unit 64 reaches a rough grinding size that is predetermined in the grinding condition determination unit 65. Then, as the rough grinding sizing signal P2 turns on, rough grinding is terminated (S4). Subsequently, measurement by the measuring apparatus 50 is also terminated (S5).

Then, it is determined whether the outer peripheral surface shape of the workpiece W calculated by the outer peripheral surface shape calculation unit 64 falls within a predetermined rough tolerance (S6). Specifically, rough tolerances are respectively set for the eccentricity, the out of roundness and the surface texture in advance, and it is determined whether the eccentricity, out of roundness and surface texture of the workpiece W calculated by the outer peripheral surface shape calculation unit 64 fall with the corresponding rough tolerances. The rough tolerances are ranges by which final target eccentricity, out of roundness and surface texture (hereinafter, also collectively referred to as "target shapes", and which correspond to a target shape according to the aspect of the invention) can be reached by later finish grinding.

Then, when at least any one of the calculated eccentricity, out of roundness and surface texture of the workpiece W exceeds a corresponding one of the rough tolerances (No in S6), it is determined to be abnormal and then grinding is terminated on the basis of an instruction from the grinding condition determination unit 65 (S8). That is, the state is a case where, even when later finish grinding is performed, the target shapes cannot be reached and it is unrecoverable.

On the other hand, when all the calculated eccentricity, out of roundness and surface texture of the workpiece W fall within the corresponding rough tolerances (Yes in S6), it is further determined whether the calculated outer peripheral surface shape of the workpiece W falls within a predetermined condition change reference value (S7). The condition change reference value is a reference value lower than the above described rough tolerance. The condition change reference value specifically includes the respective reference values of the eccentricity, out of roundness and surface texture, as in the case of the rough tolerance.

Then, when all the calculated eccentricity, out of roundness and surface texture of the workpiece W fall within the corresponding condition change reference values (Yes in S7), finish grinding is started under a predetermined finish grinding condition (S9). On the other hand, when at least any one of the calculated eccentricity, out of roundness and surface texture of the workpiece W exceeds a corresponding one of the condition change reference values (No in S7), on the basis of an instruction from the grinding condition determination unit 65, the initially set finish grinding condition is changed and then finish grinding is started under the changed finish grinding condition (S10). The changed finish grinding condition is able to reduce a grinding amount per unit time with respect to the original finish grinding condition. For example, the cutting speed of the grinding wheel 43 is reduced, or the rotational speed of the workhead 22 or grinding wheel 43 is increased.

Thereafter, finish grinding is continued until a finish grinding sizing signal P1 turns on (S11). Here, the finish grinding sizing signal P1 turns on when the outside diameter of the workpiece W calculated by the outer peripheral surface shape calculation unit 64 reaches a finish grinding size that is predetermined by the grinding condition determination unit 65. Then, as the finish grinding sizing signal P1 turns on, finish grinding is terminated (S12). Subsequently, the position of the outer peripheral surface of the workpiece W is started to be measured by the measuring apparatus 50, and the outer peripheral surface shape of the workpiece W and the outside diameter of the workpiece W are calculated by the outer peripheral surface shape calculation unit 64 on the basis of the measured position of the outer peripheral surface of the workpiece W (S13). That is, the outer peripheral surface shape (eccentricity, out of roundness and surface texture) of the workpiece W in spark-out is calculated. The spark-out is performed after finish grinding. Here, the outside diameter of the workpiece W in spark-out is also calculated at the same time.

After that, spark-out is started (S14). The spark-out is performed under the condition that a movement instruction to the grinding wheel 43 with respect to the workpiece W is set at zero. During the spark-out, measurement by the measuring apparatus 50 and calculation of the outer peripheral surface shape of the workpiece W and the outside diameter of the workpiece W by the outer peripheral surface shape calculation unit 64 are being performed.

Thereafter, it is determined whether the outside diameter of the workpiece W falls within a predetermined finish size tolerance (S15). That is, it is determined whether the outside diameter of the workpiece W has an error smaller than the finish size tolerance. Then, when the calculated outside diameter of the workpiece W exceeds the finish size tolerance (No in S15), machining is terminated because of abnormality on the basis of an instruction from the grinding condition determination unit 65 (S18).

On the other hand, when the calculated outside diameter of the workpiece W falls within the finish size tolerance (Yes in S15), it is determined whether all the calculated eccentricity, out of roundness and surface texture of the workpiece W have reached the predetermined target eccentricity, out of roundness and surface texture (which correspond to a "target shape" according to the aspect of the invention) (S16). Then, it is determined that not all the eccentricity, out of roundness and surface texture of the workpiece W have reached the corresponding target shapes, the process returns to S15 (No in S16). That is, spark-out is continued until it is determined that the outside diameter of the workpiece W falls within the finish size tolerance and all the eccentricity, out of roundness and surface texture of the workpiece W have reached the corresponding target shapes.

Then, when it is determined that all the eccentricity, out of roundness and surface texture of the workpiece W have reached the corresponding target shapes (Yes in S16), it is determined to be normal and then machining is completed on the basis of an instruction from the grinding condition determination unit 65 (S17).

With the above described grinding method, the following advantageous effects may be obtained. Measurement, which is performed after grinding in the prior art, is performed during grinding in the present embodiment. In addition, measurement during grinding according to the present embodiment determines the condition of grinding thereafter. That is, depending on the measurement results by the measuring apparatus 50, the condition of grinding after measurement may be changed. In this way, it is possible to accurately machine a workpiece while eliminating check of a product after grinding.

In addition, on the basis of the outer peripheral surface shape of the workpiece W calculated by the outer peripheral surface shape calculation unit 64, it is determined whether spark-out is terminated. Thus, spark-out may be terminated in a short period of time as compared with the prior art. Furthermore, spark-out is terminated when all the eccentricity, out of roundness and surface texture of the workpiece W have certainly reached the target shapes and the outside diameter of the workpiece W certainly falls within the finish size tolerance. Thus, even when spark-out is terminated early, it is possible to reliably satisfy the accuracy of target shapes, that is, the target eccentricity, out of roundness and surface texture.

In addition, measurement by the measuring apparatus 50 is performed during rough grinding other than during spark-out. Then, when it is determined that the obtained eccentricity, out of roundness and surface texture of the workpiece W have reached an unrecoverable degree by subsequent machining on the basis of the results measured during rough grinding, machining is terminated at that time. By so doing, according to the present embodiment, it is possible to determine at an early stage whether it is a defective piece.

In addition, the machining condition in finish grinding is changed on the basis of the outer peripheral surface shape of the workpiece W calculated by the outer peripheral surface shape calculation unit 64 during rough grinding. By so doing, on the basis of the results measured during rough grinding or between rough grinding and finish grinding, when it is determined that the workpiece W may become a defective piece if grinding is continued under the predetermined machining condition, the machining condition thereafter may be changed. Thus, even when various factors influence machining accuracy, it is possible to machine a workpiece at high speed as much as possible without producing a defective piece. That is, it is possible to achieve both accurate machining and a short machining time.

In the above embodiment, measurement by the measuring apparatus 50 is performed during rough grinding. Instead, measurement by the measuring apparatus 50 may be performed between rough grinding and finish grinding. In this case as well, substantially similar advantageous effects to those of the above embodiment may be obtained. However, when measurement is performed between rough grinding and finish grinding, it requires a measuring time. Thus, a cycle time is shorter when measurement is performed at the same time during rough grinding.

In addition, in the above embodiment, all the eccentricity, out of roundness and surface texture are referred to as the outer peripheral surface shape of the workpiece W. Other than the above, a necessary parameter may be selected depending on the accuracy required for the workpiece W. For example, only the out of roundness may be targeted.

The invention claimed is:

1. A grinding machine comprising:
   a workhead that rotatably supports a solid cylindrical or hollow cylindrical workpiece;
   a grinding wheel that moves relative to the workhead in a direction that intersects with a rotation axis of the workhead to grind an outer peripheral surface of the workpiece;
   a measuring apparatus that measures a position of the outer peripheral surface of the workpiece corresponding to a rotation angle of the workhead;
   an outer peripheral surface shape calculation unit programmed to calculate an outer peripheral surface shape of the workpiece on the basis of the position of the outer peripheral surface of the workpiece measured by the measuring apparatus during grinding; and
   a grinding condition determination unit that determines a condition of grinding, which is performed after measurement by the measuring apparatus, on the basis of the calculated outer peripheral surface shape,
   wherein the outer peripheral surface shape of the workpiece includes at least any one of an outer peripheral surface shape of the workpiece with respect to a rotation center of the workpiece, an out of roundness of the workpiece and a surface texture of the workpiece.

2. The grinding machine according to claim 1, wherein
the outer peripheral surface shape calculation unit is programmed to calculate an outer peripheral surface shape of the workpiece during spark-out, and
the grinding condition determination unit terminates the spark-out when the calculated outer peripheral surface shape has reached a predetermined target shape.

3. The grinding machine according to claim 1, wherein
the outer peripheral surface shape calculation unit is programmed to calculate an outer peripheral surface shape of the workpiece during rough grinding or between rough grinding and finish grinding, and
the grinding condition determination unit terminates grinding when the calculated outer peripheral surface shape does not satisfy a predetermined shape condition.

4. The grinding machine according to claim 1, wherein
the outer peripheral surface shape calculation unit is programmed to calculate an outer peripheral surface shape of the workpiece during rough grinding or between rough grinding and finish grinding, and
the grinding condition determination unit changes a machining condition in the finish grinding on the basis of the calculated outer peripheral surface shape.

5. The grinding machine according to claim 4, wherein
the grinding condition determination unit changes a grinding amount per unit time in the finish grinding on the basis of the calculated outer peripheral surface shape.

6. The grinding machine according to claim 5, wherein
the grinding condition determination unit decreases a grinding amount per unit time in the finish grinding on the basis of the calculated outer peripheral surface shape.

7. The grinding machine according to claim 1, wherein the measuring apparatus is slidably located on a rail parallel to an axis of the workpiece.

8. A grinding method that grinds an outer peripheral surface of a rotatably supported solid cylindrical or hollow cylindrical workpiece by moving a wheelhead relative to the workpiece in a direction that intersects with a rotation axis of the workpiece, comprising:
measuring a position of an outer peripheral surface of the workpiece corresponding to a rotation angle of the workpiece by a measuring apparatus during grinding;
calculating an outer peripheral surface shape of the workpiece on the basis of the position of the outer peripheral surface measured by the measuring apparatus; and
determining a condition of grinding, which is performed after measurement by the measuring apparatus, on the basis of the calculated outer peripheral surface shape,
wherein the outer peripheral surface shape of the workpiece includes at least any one of an outer peripheral surface shape of the workpiece with respect to a rotation center of the workpiece, an out of roundness of the workpiece and a surface texture of the workpiece.

* * * * *